No. 889,008. PATENTED MAY 26, 1908.
W. T. HOLLIS.
MEASURING MACHINE.
APPLICATION FILED NOV. 23, 1907.

4 SHEETS—SHEET 1.

Witnesses.
C. H. Gammett
J. Murphy

Inventor.
Warren Thatcher Hollis
by Jas. H. Churchill
Attys.

No. 889,008. PATENTED MAY 26, 1908.
W. T. HOLLIS.
MEASURING MACHINE.
APPLICATION FILED NOV. 23, 1907.

4 SHEETS—SHEET 2.

Witnesses.
C. H. Gannett
J. Murphy

Inventor.
Warren Thatcher Hollis
by Jas. H. Churchill
atty.

No. 889,008.

PATENTED MAY 26, 1908.

W. T. HOLLIS.
MEASURING MACHINE.
APPLICATION FILED NOV. 23, 1907.

4 SHEETS—SHEET 3.

Witnesses.

Inventor:
Warren Thatcher Hollis
by Jas. H. Churchill
Atty.

Witnesses
Inventor.
Warren Thatcher Hollis

UNITED STATES PATENT OFFICE.

WARREN THATCHER HOLLIS, OF BOSTON, MASSACHUSETTS.

MEASURING-MACHINE.

No. 889,008.  Specification of Letters Patent.  Patented May 26, 1908.

Application filed November 23, 1907. Serial No. 403,523.

*To all whom it may concern:*

Be it known that I, WARREN THATCHER HOLLIS, a citizen of the United States, residing in Boston, in the county of Suffolk and State of Massachusetts, have invented an Improvement in Measuring-Machines, of which the following description, in connection with the accompanying drawings, is a specification, like letters on the drawings representing like parts.

This invention relates to a surface measuring machine of the class commonly employed for measuring the surface area of hides, skins and leather.

Measuring machines of the class referred to are provided with a series of measuring wheels which are rotated by contact with the hide or skin and which are separated from one another, so that calculations or allowances are required to be made for the space between adjacent measuring wheels. The spaces referred to give rise to errors and interfere with the accuracy of the machine.

The present invention has for its object to provide a machine in which the space between adjacent measuring wheels or elements may be reduced to a minimum and practically eliminated, so that a substantially continuous measuring surface may be presented for engagement with the hide, skin or leather. Provision is also made for retaining an indicating device in the position into which it is moved by the individual measuring elements and for releasing the same to permit it to return to its normal position. These and other features of this invention will be pointed out in the claims at the end of this specification.

Figure 1:
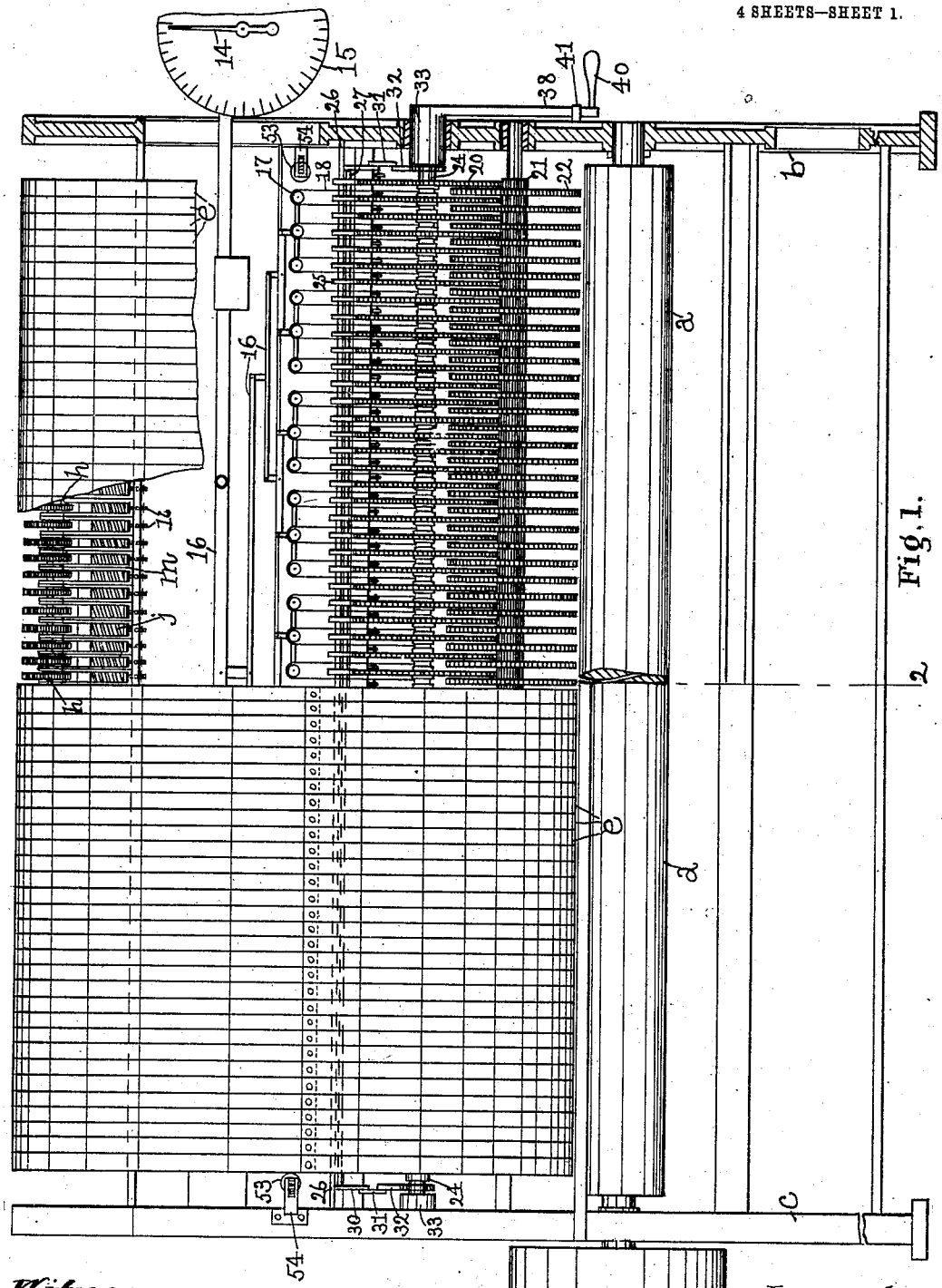
Figure 2:
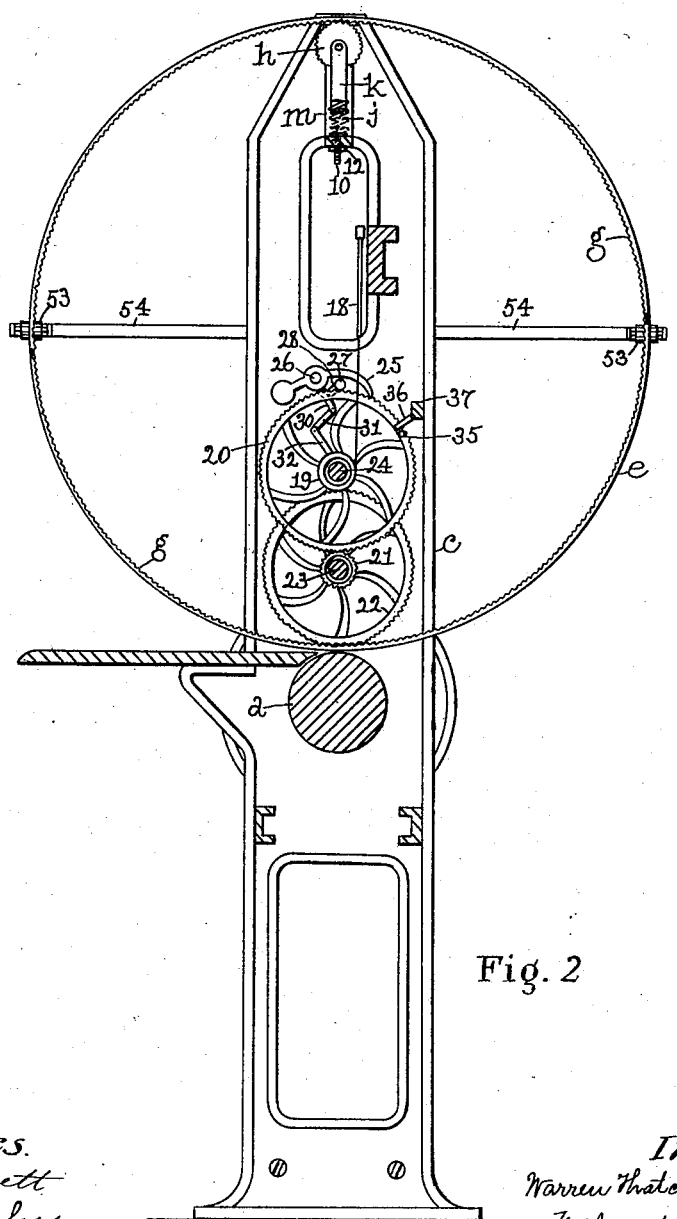
Figures 3, 4:
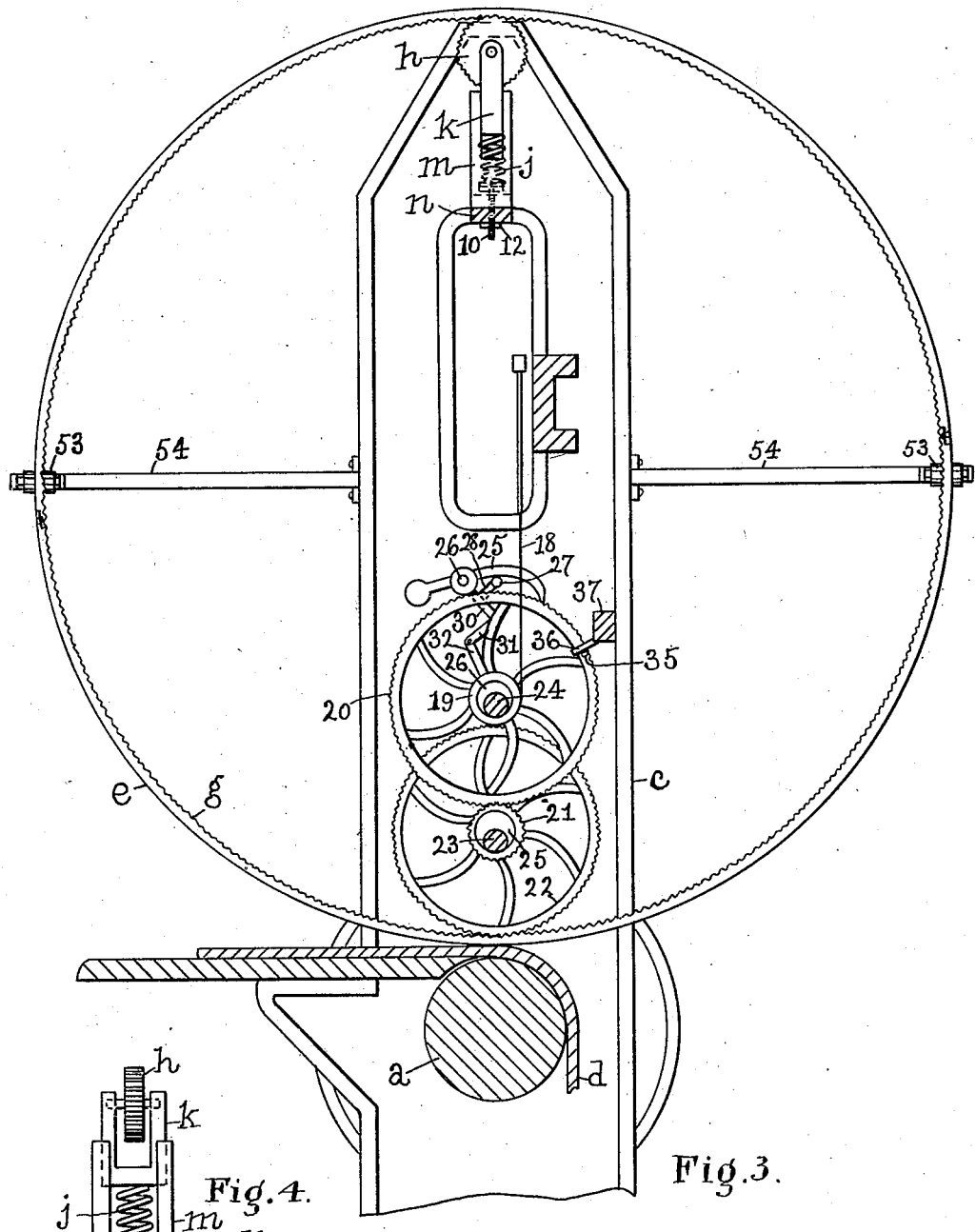
Figures 5, 6, 7:
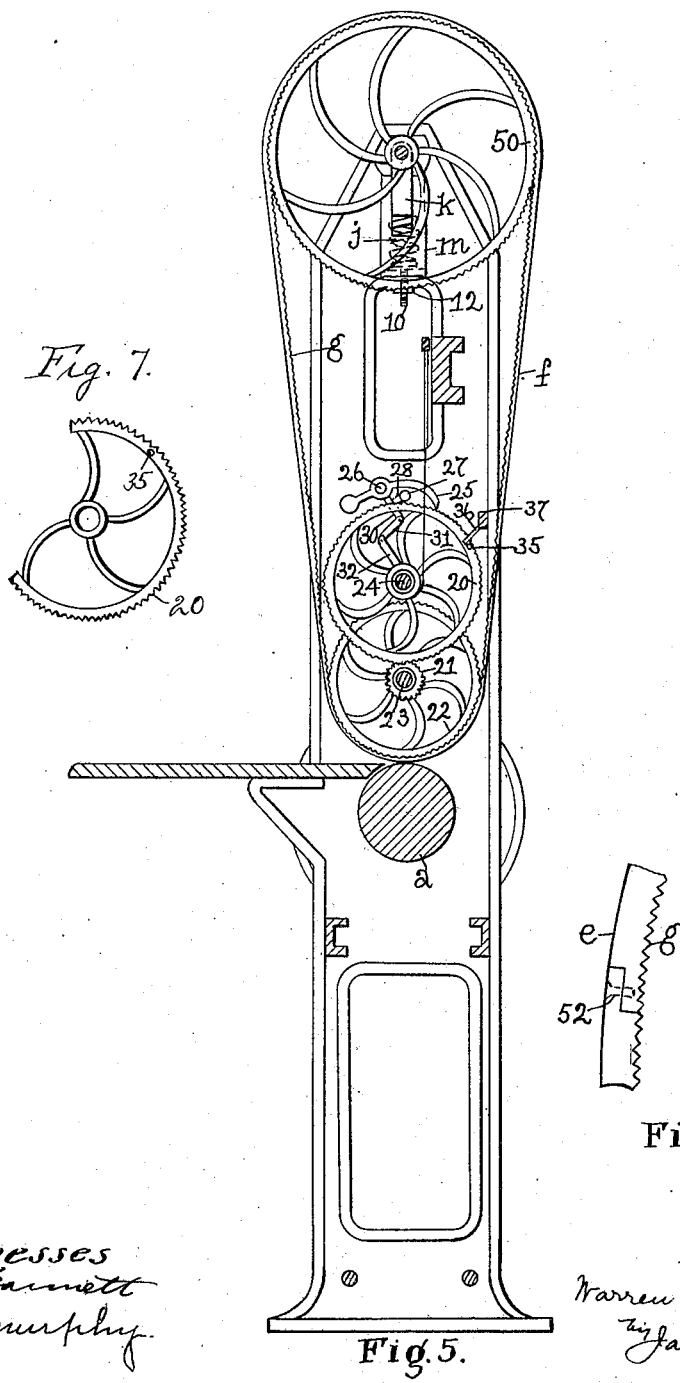

Figure 1 is a front elevation with parts broken away of a measuring machine embodying this invention. Fig. 2, a cross section on the line 2—2, Fig. 1. Fig. 3, an enlarged section of the upper portion of the machine in its operative position. Fig. 4, a detail to be referred to. Fig. 5, a sectional view of a modification to be referred to, Fig. 6, a detail to be referred to, and Fig. 7, a modification to be referred to.

Referring to the drawings, $a$ represents a rotatable bed roll, journaled in bearings in the upright sides $b$, $c$, of the framework of the machine. The bed roll $a$ has coöperating with it a plurality of measuring elements or members, which are designed to engage the hide, skin or leather $d$, and which are capable of being arranged close together so as to present a substantially continuous measuring surface. The measuring elements may be made in the form of rings $e$ as shown in Figs. 1, 2 and 3, or bands or belts $f$ as shown in Fig. 5.

The rings $e$ are provided on their interior with substantially fine teeth $g$, which coöperate with toothed rings or gears $h$, which serve as supports for the rings $e$ (see Fig. 3). The rings $e$ may be yieldingly supported, which may be accomplished as herein shown, by means of helical springs $j$, (see Fig. 4), each of which engages a sliding bracket or frame $k$, in which the shaft of the gear or toothed wheel $h$ is journaled, said frame or bracket being movable in guideways in stationary uprights $m$, erected upon a cross bar $n$ supported by the framework of the machine. The tension or force of the spring $j$ may be adjusted by a threaded rod or bolt 10 and nut 12.

The internally toothed rings $e$ are provided with a smooth external surface, and being internally supported are capable of being arranged side by side in close proximity to one another so as to form a substantially continuous measuring surface (see Fig. 1) to engage the hide, skin or leather, whereby inaccuracies in measuring the surface areas due to spaces between the measuring wheels, above referred to, are avoided or at least reduced to a minimum.

The rings $e$ are capable of bodily movement, and by means of the adjusting devices for the springs $j$, said rings can be moved bodily toward and from the bed roll, to adjust the machine to measure stock of different thickness. The measuring rings $e$ are also rotated by contact with the hide, skin or leather, and this rotary movement is transmitted to an indicating device, which may be a pointer 14 coöperating with a graduated dial 15 and actuated in the usual manner by a system of levers 16, pulleys 17 and cords 18, similar to the well-known Sawyer measuring machine. The cords 18 are attached to the hubs 19 of toothed devices or wheels 20, one for each ring $e$, and the wheels 20 engage pinions 21 attached to the hub of toothed wheels or gears 22, which in turn mesh with and are driven by the internally toothed rings $e$.

Provision is made for permitting the wheels 22, 20 to be moved bodily upward with the rings *e*, which is accomplished by mounting said wheels upon shafts 23, 24 (see Fig. 3), which are smaller in diameter than the openings 25, 26, in the hubs of said wheels.

Provision is made for retaining each ring *e* and the wheels 22, 20 coöperating therewith in the position into which they are moved by the hide, skin or leather whose surface is being measured. To this end the wheel 20 has coöperating with it a holding pawl 25 loosely mounted on a pivot rod or shaft 26 supported by the framework of the machine. The pawl 25 is free to turn on its shaft 26 and is capable of being moved thereon to disengage it from the wheel 20 by a rod 27 extended cross-wise of the machine beneath the pawls 25, the said rod being supported by arms 28 on cranks 30 fast on the shaft 26 at its opposite ends. The cranks 30 are joined by links 31 to cranks or arms 32 on the end of the shaft 24, upon which the wheels 20 are loosely mounted. The shaft 24 is provided at its ends with eccentric journals 33 (see Fig. 1) mounted in the side frames, and said journals are sufficiently large to cause the shaft 24 in its rotation to lift the wheels 20 out of mesh with the toothed hubs or pinions 21 and also lift the pawls 25 from their toothed wheels 20, thus leaving the said wheels free to be returned to their starting position shown in Fig. 3, with a stop pin 35 on the wheel in engagement with a stop arm 36 on a cross bar 37 attached to the side frames of the machine.

The rotation of the shaft 24 to lift the wheels 20 and to effect disengagement of the pawls 25 from their coöperating wheels, may be accomplished by means of a crank 38 provided with a handle 40, the shaft 24 being normally held stationary by lugs 41 between which the crank 38 is placed.

In operation with the machine thus far described, the rings *e* are normally positioned with relation to the bed roll according to the thickness of the material being measured, so that the stock fed by the rotation of the bed roll will engage the rings *e*, lift the same and also rotate them. As the rings *e* are lifted, the toothed wheels 22, which are at all times in mesh with the rings *e*, are lifted, as are also the pinions 21 and toothed wheels 20. The rings *e* are rotated by the hide, skin or leather, and said rings in turn rotate the toothed wheels 22 and pinions 21, and the latter rotate the toothed wheels 20 and their hubs 19, with the result that the pointer or index 14 is turned over the dial 15 by the intermediate mechanism connecting said pointer with the hubs 19.

It will be understood that only the rings *e* which make contact with the hide, skin or leather are rotated by the same. After the hide or skin has passed out of contact with the rings *e*, the latter descend to their normal position, and the toothed wheels 20 are then raised to disengage them from their actuating pinions 21, by the operator turning the shaft 24, and at the same time, the pawls 25 are disengaged from the wheels 20, thus leaving the latter free to be turned back to their starting position, indicated in Fig 3, with the pin 35 in engagement with the stop arm 36. The return movement of the toothed wheels 20 may be effected by the weight of the intermediate mechanism between the wheels 20 and the index 14. After the wheels 20 have been returned to their normal position, the shaft 24 is turned back so as to lower said wheels into engagement with the pinions 21.

I may prefer to make the measuring elements in the form of rings *e* as shown in Figs. 1, 2 and 3, but I do not desire to limit my invention in this respect, as the said elements may be made in the form of flexible endless bands *f*, as represented in Fig. 5. In this latter case, the individual bands are suspended by substantially large toothed wheels 50. In other respects, the construction shown in Fig. 5 is substantially the same as that shown in Figs. 1, 2 and 3.

From the above description and by inspection of Fig. 1, it will be seen that the internally toothed endless measuring elements or members are capable of being arranged side by side in close proximity to one another, so as to form a substantially continuous measuring surface to engage substantially the entire surface of the material being measured, such as a hide or skin. In this way a more accurate measurement is obtained.

It will be observed, that the operating mechanism for the indicating device is located within the movable measuring elements.

The toothed device 20 is shown as a wheel, but if desired it might be a segment of a wheel, like that commonly employed in machines of this class and represented in Fig. 7. It will be observed that the measuring elements are suspended from their top or upper portion and that their lower portion sustains the mechanism which actuates the indicating device. If desired, the ring *e* and band *f* may be made in a single piece, or, as is preferred in two parts or halves secured together as by screws 52 or otherwise, (see Fig. 6). To limit any axial or end movement of the rings *e* or bands *f*, stops may be provided, such as rollers 53 arranged on arms 54 attached to the side frames of the machine, said rollers being adapted to engage the endmost rings or bands at substantially diametrically opposite points, as represented in Fig. 3.

By reference to Figs. 2 and 3, it will be seen that the toothed wheels or gears 22 are permanently in mesh with the internally toothed rings or bands, and that the wheel 20 is in mesh with the pinion 21 except when the wheel 20 is positively lifted to permit its return movement, thereby avoiding errors from lost motion between these elements.

I have herein represented one construction of machine embodying my invention, but I do not desire to limit the invention to the particular construction shown.

Claims.

1. In a machine of the character described, in combination, an index or pointer, a dial with which the same coöperates, a rotatable bed roll, a plurality of internally toothed movable measuring elements coöperating with said bed roll, toothed wheels in engagement with the internal teeth of said elements, toothed hubs or pinions attached to said toothed wheels, a shaft on which said toothed wheels and hubs are loosely mounted, toothed rotatable devices normally in engagement with said toothed hubs, a shaft on which said toothed devices are loosely mounted, and mechanism connecting said toothed devices with said index or pointer, substantially as described.

2. In a machine of the character described, in combination, a plurality of endless measuring elements arranged side by side in substantially close proximity and provided with internal teeth, an indicating device, gears in mesh with the internal teeth of said measuring elements, and means actuated by said gears for operating said indicating device, substantially as described.

3. In a machine of the character described, in combination, a plurality of endless measuring elements arranged side by side in substantially close proximity to present a substantially continuous contacting surface, an indicating device, and means located within said endless elements and driven by the same for actuating said indicating device, substantially as described.

4. In a machine of the character described, in combination, a plurality of endless measuring elements arranged side by side in substantially close proximity to present a substantially continuous contacting surface, means within said endless elements to suspend the same, an indicating device, and means located within said endless elements and driven by the same for actuating said indicating device, substantially as described.

5. In a machine of the character described, in combination, a plurality of measuring elements provided with an inner surface and arranged side by side in substantially close proximity and capable of being moved by contact with the surface of the object being measured, an indicating device, and mechanism for actuating said indicating device operated by engagement with the inner surface of said measuring elements, substantially as described.

6. In a machine of the character described, in combination, a plurality of measuring elements arranged side by side to engage the object whose surface is being measured, and provided with internal teeth, gearing in engagement with said internal teeth and driven thereby, and an indicating device actuated by said gearing, substantially as described.

7. In a machine of the character described, in combination, a plurality of endless measuring elements provided with the inner surface and arranged side by side in substantially close proximity, and capable of being rotated and moved bodily by contact with the object whose surface is being measured, an indicating device, and mechanism for operating said indicating device actuated by engagement with the inner surface of said elements, substantially as described.

8. In a machine of the character described, in combination, a plurality of endless measuring elements rotatable and movable bodily by contact with the object whose surface is being measured, an indicating device, and devices supported within said measuring elements and actuated thereby for operating said indicating device, substantially as described.

In testimony whereof, I have signed my name to this specification in the presence of two subscribing witnesses.

WARREN THATCHER HOLLIS.

Witnesses:
ALBIN L. RICHARDS,
JAS. H. CHURCHILL.